Patented Jan. 10, 1939

2,143,438

UNITED STATES PATENT OFFICE 2,143,438

PROCESS FOR THE PRODUCTION OF MONO-
CALCIUM CHLOROPHOSPHATE

Edward J. Fox, Washington, D. C., assignor to
Henry A. Wallace as Secretary of Agriculture
of the United States of America and his successors in office No Drawing. Application October 22, 1937,
Serial No. 170,402

7 Claims. (Cl. 23—109)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

This invention relates to the manufacture of monocalcium chlorophosphate, the chemical composition of which is indicated by the formula $CaClH_2PO_4.H_2O$, and to mixtures containing this and other calcium salts substantially free from calcium chloride. These products contain high percentages of soluble $P_2O_5$ and are suitable for fertilizer purposes, or may be used in the manufacture of other phosphate compounds useful in the arts and industries.

In the conversion of muriate of potash to potassium sulfate by the sulfuric acid process, hydrochloric acid equivalent to the sulfuric acid is generated, for which a suitable outlet is sought in the fertilizer industry. In present practice this acid is used to dissolve phosphate rock in the manufacture of dicalcium phosphate. By neutralizing the resulting calcium chloride-phosphoric acid solution with milk-of-lime dicalcium phosphate is precipitated and is recovered by filtering and washing to remove calcium chloride. Obviously this process is wasteful not only of hydrochloric acid, which is finally discarded as dilute calcium chloride solution, but of milk-of-lime, which is required as an additional reagent.

By my process the use of milk-of-lime and the problem of disposing of waste calcium chloride solution are eliminated and the efficiency of the reagent acid required to decompose the phosphate rock is greatly increased. On the other hand, the phosphate is obtained as a monobasic, water-soluble salt comparable with, but in a more concentrated form than, ordinary superphosphate made by the sulfuric acid process.

I have found that the hydrochloric acid required to dissolve phosphate rock is approximately equivalent to the calcium content of the rock and that the resulting solution contains free acid approximately equivalent to the phosphate content of the dissolved rock. The maximum concentration at 25° C. is about 1.3 gram moles of phosphoric acid and 2.3 gram moles of calcium chloride per kilogram of solution, specific gravity 1.35; and at 100° C. 1.6 gram moles of phosphoric acid and 2.6 gram moles of calcium chloride per kilogram of solution, specific gravity 1.40.

I have also found on evaporating solutions of calcium chloride and phosphoric acid of the above approximate proportions that hydrochloric acid gas is evolved and a precipitate is obtained in which calcium, chloride and phosphate ions are combined as indicated by the formula $$CaClH_2PO_4.H_2O.$$

Since the $CaO/P_2O_5$ mol-ratio of ordinary phosphate rock is approximately 3.5, the following general equations show the relationships and reactions described above without regard to minor constituents.

(1)  $7CaO.2P_2O_5 + 14HCl = 7CaCl_2 + 4H_3PO_4 + H_2O$
(2)  $CaCl_2 + H_3PO_4 + H_2O = CaClH_2PO_4.H_2O + HCl$

Calcium chloride produced by the primary reaction is in excess of phosphoric acid to combine with it in the secondary reaction and the removal of this excess constitutes the crux of the problem in producing an acceptable phosphatic fertilizer with hydrochloric acid.

Monocalcium chlorophosphate precipitated in the manner indicated above is ordinarily extremely finely divided and can be separated from its mother liquor only with difficulty and by procedures which would be too costly for a phosphatic fertilizer material. Furthermore, complete precipitation of the monocalcium chlorophosphate can be obtained only by evaporation of the solution to the point of saturation with respect to calcium chloride and the consistency of the resulting mixture is such that separation of the solid and liquid phases is impractical. The mixture obtained by evaporating such solutions to dryness is not suitable for fertilizer because of the undesirable physical and chemical properties of calcium chloride.

Leaching the dried product with water to remove calcium chloride is unsatisfactory because in so doing monocalcium chlorophosphate is partly dissolved and partly hydrolyzed. Wherefore, my preferred procedure is to adjust the mol-ratio of the reactants so that the final product, obtained on evaporating to dryness, contains no residue of calcium chloride. This adjustment may be made by adding phosphoric acid, or by generating the same in the mixture by the action of sulfuric or nitric acid on phosphate rock included in the charge for that purpose. As in the case of hydrochloric acid, the primary reaction between phosphate rock and sulfuric or nitric acid yields phosphoric acid and the calcium salt of the added acid (Equation 1) and the latter may be left in the final product admixed with monocalcium chlorophosphate resulting from reaction between calcium chloride and phosphoric acid (Equation 2). When so treated it is not necessary to completely dissolve the rock to effect its final decomposition. Hydrochloric acid that is released by the secondary reaction between calcium chloride and phosphoric acid is effective in decomposing additional phosphate rock, if present in the system, and this cyclic reaction proceeds to the exhaustion of either or both reagent acid and rock during the process of drying the mixture. It is therefore possible to reduce the quantity of reagent acid added per unit of phosphate rock because of this secondary reaction in which phosphoric acid is caused to combine in the production of a solid salt.

The following equations indicate the molal quantities required to produce (3), monocalcium chlorophosphate alone, and (4) a mixture of monocalcium chlorophosphate and calcium sulfate.

(3) $7CaO.2P_2O_5 + 3H_3PO_4 + 7HCl + 6H_2O = 7CaClH_2PO_4.H_2O$ (4) $7CaO.2P_2O_5 + 3H_2SO_4 + 4HCl + 3H_2O = 4CaClH_2PO_4.H_2O + 3CaSO_4$

By substituting an equivalent quantity of nitric acid for sulfuric acid in Equation 4, a mixture of monocalcium chlorophosphate and calcium nitrate may be obtained.

Manifestly, the process is not limited to such simple mixtures as those indicated above, but by employing suitable combinations of acids, mixtures of any desired composition may be obtained. Thus, by treating phosphate rock with nitric, hydrochloric, phosphoric, and sulfuric acids in suitable proportions, any mixture of monocalcium chlorophosphate, monocalcium phosphate, calcium nitrate, and/or calcium sulfate desired may be produced.

My process is not limited to the use of aqueous solutions of the reagent acids, for I have found that phosphate rock-water mixtures are highly effective in absorbing gaseous hydrogen chloride, whereby monocalcium chlorophosphate may be obtained.

I have also found that anhydrous calcium chloride and phosphoric acid (85 percent $H_3PO_4$), when intimately mixed in equimolal proportions yield monocalcium chlorophosphate and hydrogen chloride gas in accordance with Equation 2 above. When solid calcium chloride and liquid phosphoric acid are mixed, the mixture quickly sets to a solid that may be readily pulverized. When calcium chloride dissolved in absolute alcohol or glacial acetic acid is mixed with phosphoric acid, monocalcium chlorophosphate separates as a solid phase. Prolonged digestion of precipitated monocalcium chlorophosphate in its mother liquor, at, or near, its boiling point, promotes crystal growth and the pure chemical compound, in large, well defined and distinctive crystals easily separated from the liquid by filtering or by centrifuging, is obtained.

The following typical experiments are cited as illustrations:

A. A solution of 390 grams of C. P. calcium chloride and 416 grams of 85 percent phosphoric acid in 694 grams of water was partially evaporated to cause precipitation of monocalcium chlorophosphate. Then, by means of a reflux condenser, the volume of the solution was held constant while the mixture was digested at the boiling point (ca. 120° C.) for about forty hours. After the mixture had cooled to about 70° C., it was transferred to a high speed centrifuge to separate the solid and liquid phases. The yield of dried monocalcium chlorophosphate was 231 grams, or about one-third of theoretical (Equation 2).

B. A solution of phosphate rock in hydrochloric acid, containing the equivalent of 2.3 gram moles of calcium chloride and 1.3 gram moles of phosphoric acid per kilogram of solution was evaporated to dryness on a steam bath, the residue washed several times with alcohol to remove calcium chloride, and the filter cake dried in air at room temperature (Equations 1 and 2).

C. A mixture of 10 kilograms of ground Florida pebble phosphate rock (34.7 percent $P_2O_5$, 47.3 percent CaO and 8.6 percent acid-insoluble residue), 2.87 liters of 75 percent phosphoric acid and 8.65 liters of 30.5 percent hydrochloric acid, evaporated to dryness under reduced pressure in an autoclave yielded 18 kilograms of crude monocalcium chlorophosphate (Equation 3).

D. A mixture of 870 grams of ground Tennessee rock (34 percent $P_2O_5$, 45 percent CaO and 11 percent acid-insoluble residue), 310 grams of 95 percent sulfuric acid and 400 grams of 37 percent hydrochloric acid, evaporated to dryness on a steam bath at atmospheric pressure yielded 1292 grams of mixed product (Equation 4).

Analyses of these typical products are given in the following table for convenience in making comparisons with the theoretical composition for monocalcium chlorophosphate.

| | A | B | C | D | Theoretical for $CaClH_2PO_4.H_2O$ |
|---|---|---|---|---|---|
| $P_2O_5$ total weight, percent | 37.27 | 35.39 | 34.92 | 22.0 | 37.27 |
| $P_2O_5$ W. S. total weight, percent | 37.27 | 35.39 | 31.75 | 15.3 | 37.27 |
| $P_2O_5$ C. I. total weight, percent | None | | 0.17 | 0.8 | None |
| CaO total weight, percent | 29.47 | 30.20 | 26.81 | 29.4 | 29.42 |
| Cl total weight, percent | 18.59 | 17.41 | 15.12 | 10.0 | 18.60 |
| $SO_3$ total weight, percent | | | | 18.6 | |
| Acid insoluble weight, percent | | None | 5.20 | 7.7 | |

The physical properties of these products are such as will permit their use for fertilizer purposes.

Having thus described my invention, I claim:

1. A process for producing monocalcium chlorophosphate, which process comprises dissolving phosphate rock in hydrochloric acid, removing the insoluble gangue from the resulting solution, adding phosphoric acid to obtain equimolecular amounts of calcium chloride and phosphoric acid, and evaporating the final mixture to dryness.

2. A process for the production of monocalcium chlorophosphate corresponding to the formula $CaClH_2PO_4.H_2O$, which process comprises reacting calcium chloride and phosphoric acid in equimolecular amounts and drying the mixture.

3. A process for the production of crude monocalcium chlorophosphate substantially free from calcium chloride, suitable for fertilizer purposes, which process comprises mixing ground phosphate rock, concentrated hydrochloric acid, and concentrated phosphoric acid in proportions yielding a mixture containing calcium, chlorine, and phosphorus in the atomic ratio 1:1:1 and drying the mixture.

4. A process for the production of crude monocalcium chlorophosphate substantially free from calcium chloride, suitable for fertilizer purposes, which process comprises absorbing hydrogen chloride gas in ground phosphate rock containing 10–15 percent of free moisture, mixing with the resulting product phosphoric acid in proportions yielding a mixture containing calcium, chlorine, and phosphorus in the atomic ratio 1:1:1 and drying the final product.

5. A process for the production of crude monocalcium chlorophosphate substantially free from calcium chloride, suitable for fertilizer purposes, which process comprises absorbing hydrogen chloride gas in ground phosphate rock containing 10–15 percent of free moisture, mixing with the resulting product monocalcium phosphate in proportions yielding a mixture containing calcium, chlorine, and phosphorus in the atomic ratio 1:1:1 and drying the final product.

6. A process for the production of crude monocalcium chlorophosphate substantially free from calcium chloride, suitable for fertilizer purposes, which process comprises absorbing hydrogen chloride gas in a mixture of ground phosphate rock containing 10–15% of free moisture and monocalcium phosphate in proportions yielding a mixture containing calcium, chlorine, and phosphorus in the atomic ratio 1:1:1, thence drying the final product.

7. A process for the production of crude monocalcium chlorophosphate, substantially free from calcium chloride, suitable for fertilizer purposes, which process comprises absorbing hydrogen chloride gas in ground phosphate rock containing 10–15% of free moisture, the while mixing with it a material chosen from the group consisting of phosphoric acid and monocalcium phosphate in proportions yielding a mixture containing calcium, chlorine, and phosphorus in the atomic ratio of 1:1:1, thence drying the final product.

EDWARD J. FOX.